United States Patent
Faerber (10) Patent No.: US 7,850,230 B2
(45) Date of Patent: Dec. 14, 2010

(54) VEHICLE ROOF WITH A ROOF PART THAT CAN BE DISPLACED ABOVE THE ROOF

(75) Inventor: Manfred Faerber, Wielenbach (DE)

(73) Assignee: Webasto AG, Stockdorf (DE)

( * ) Notice: Subject to any disclaimer, the term of this patent is extended or adjusted under 35 U.S.C. 154(b) by 445 days.

(21) Appl. No.: 11/993,819

(22) PCT Filed: Jun. 26, 2006

(86) PCT No.: PCT/DE2006/001092

§ 371 (c)(1),
(2), (4) Date: Dec. 21, 2007

(87) PCT Pub. No.: WO2007/000146

PCT Pub. Date: Jan. 4, 2007

(65) Prior Publication Data

US 2010/0084893 A1    Apr. 8, 2010

(30) Foreign Application Priority Data

Jun. 27, 2005  (DE) ................. 10 2005 030 055

(51) Int. Cl.
*B60J 7/22* (2006.01)
*B60J 7/047* (2006.01)
(52) U.S. Cl. .............. 296/217; 296/216.03; 296/216.06
(58) Field of Classification Search ............ 296/216.06, 296/217, 216.03
See application file for complete search history.

(56) References Cited

U.S. PATENT DOCUMENTS 4,709,959 A * 12/1987 Paerisch et al. ............. 296/217

(Continued)

FOREIGN PATENT DOCUMENTS

EP    0863817    10/1997

(Continued)

OTHER PUBLICATIONS

International Search Report for PCT/DE2006/001092 dated Nov. 27, 2006.

*Primary Examiner*—Dennis H Pedder
(74) *Attorney, Agent, or Firm*—Marshall, Gerstein & Borun LLP (57) ABSTRACT

The invention relates to a vehicle roof with a movable roof part, which by means of a tilt lever, which is connected in an articulated manner close to the rear edge of the roof part, can first be tilted into a ventilating position and can then be slid above the vehicle roof or above an at least partially fixed roof part for the at least partial release of an opening in the vehicle roof, the movable roof part being continuously supported in the area of its rear edge when it is slid from the ventilating position backwards and the movable roof part having a continuous side skirt in the area of its side edges. In order to ensure reliable support and at the same time a pleasing appearance, the rear edge of the movable roof part is continuously supported during the tilting movement and the sliding movement by means of the tilt lever and the side skirt, which is independent of the support system for the movable roof part, lies continuously adjacent a seal arranged at the edge of the roof opening or close to the upper end of the guide rail during the tilting movement and during the sliding movement.

7 Claims, 7 Drawing Sheets

U.S. PATENT DOCUMENTS

| | | | |
|---|---|---|---|
| 6,030,031 A * | 2/2000 | Martinus Lenkens | 296/217 |
| 6,158,803 A | 12/2000 | Reihl et al. | |
| 6,547,320 B2 | 4/2003 | Kohout et al. | 296/223 |
| 6,974,183 B2 * | 12/2005 | Bergmiller et al. | 296/220.01 |
| 2002/0070586 A1 | 6/2002 | Kohout et al. | |
| 2002/0125743 A1 | 9/2002 | Bohm et al. | |

FOREIGN PATENT DOCUMENTS

| | | |
|---|---|---|
| EP | 1486367 | 7/1999 |
| EP | 1193098 | 4/2002 |
| WO | WO 2006/086958 | 8/2006 |

* cited by examiner

VEHICLE ROOF WITH A ROOF PART THAT CAN BE DISPLACED ABOVE THE ROOF

BACKGROUND OF INVENTION

1. Field of Invention

The invention relates to a vehicle roof having a roof part which can be set out with its rear edge and can be displaced above the roof.

2. Related Technology

EP 1 468 367 A2 discloses a vehicle roof of said type. In said vehicle roof, a side wall of the displaceable roof part is embodied as a load-bearing wall and is provided at its underside with sliding elements which engage into the lateral guide rails. The load-bearing wall must be relatively stable. It is correspondingly heavy, and on account of the predefined fixed spacing of the upper edge of the cover to the sliding element, entails restrictions as viewed in the height of the vehicle with regard to the mobility of the roof part as the latter is displaced.

EP 0 863 817 B1 discloses a further vehicle roof having an externally-guided roof part. In said vehicle roof, the openable roof part is raised by means of a setting-out mechanism and, at the start of the displacement movement, is passed to a separate support lever which is displaceably mounted with its lower end in an upwardly open, laterally offset elongation of the guide rail. As the setting-out mechanism is passed to the support lever, the two elements are in engagement for a short movement phase, resulting in static overdetermination. In this phase, under some circumstances, the drive requires increased drive forces which also adversely affect a sensor arrangement for an anti-trap arrangement.

US 2002/0125743 A1 discloses a vehicle roof in which—similarly to EP 1 486 367 A2—an externally guided openable roof part is guided with a very simple mechanism which has a rigid bracket. The lifting takes place by means of suitable ramps in the guide rails, so that the setting-out of the rear edge can take place only at the same time as a displacement of the roof part.

SUMMARY OF THE INVENTION

The invention provides a vehicle roof wherein the openable roof part is supported continuously by setting-out levers during the setting-out and during the displacement, and is nevertheless visually appealing.

According to the invention, a vehicle roof has a movable roof part which, by means of a setting-out lever articulatedly connected close to its rear edge, can firstly be set out into a ventilation position and can subsequently be displaced above the vehicle roof, or above a roof part which is fixed at least at times, in order to at least partially open a roof opening in the vehicle roof, with the movable roof part being continuously further supported in the region of its rear edge as it is displaced rearwardly from the ventilation position, and with the movable roof part having in each case one side screen in the region of its lateral edges, wherein the support of the rear edge of the movable roof part takes place continuously, both during the setting-out movement and also during the displacement movement, by means of a setting-out lever, and wherein the side screen, which is independent of the support of the movable roof part, bears continuously, both during the setting-out movement and also during the displacement movement, against a seal which is arranged on the edge of the roof opening or close to the upper end of a guide rail.

The invention provides, in essence, that the rear edge of the displaceable roof part which can be set out is supported continuously in all movement positions by the same setting-out lever, so that no passing to separate support levers need take place. The setting-out levers are actuated by control carriages which are displaced from the closed position via the ventilation position to the fully-open position in the same direction. The control carriages also actuate a locking device which blocks a displacement of the roof part during the setting-out movement, as is described in the prior German patent application 10 2005 007 032.9-24 whose entire content of disclosure is hereby included in the content of the present application. In order to hide the actuating mechanism and to prevent the infiltration of side wind and dirt, a side screen which is fully independent of the actuating mechanism is provided at both side edges of the movable roof part, which side screen is at all times in contact with its outer side against a seal which seals off the outer edge of the guide channel on the fixed vehicle roof. Since, in contrast to the prior art, the side screen has no load-bearing function, it can be designed to be so narrow and coordinated with the setting-out and displacement mechanism in such a way that said side screen and setting-out and displacement mechanism do not hinder one another or entail additional installation space.

According to one advantageous embodiment, a further seal is arranged in the lateral edge region on the roof part which is arranged behind the roof opening and which is fixed at least at times, against which further seal the side screen bears with its inner side during a displacement of the roof part rearward.

Particularly advantageous is an embodiment in which the setting-out lever is arranged directly adjacent to the inner side of the side screen.

According to a further advantageous embodiment, the openable roof part, for the lifting of its front edge, is at least pivotably articulatedly connected to a front setting-out lever, with the setting-out lever being arranged directly adjacent to the inner side of the side screen.

The movable roof part is preferably formed by a glass plate and an extrusion coating, which surrounds the glass plate, in the form of a plastic frame. In this case, the side screen is preferably formed in one piece with the extrusion coating, that it is to say said side screen is preferably also generated in the mold during the production of the extrusion coating or is placed as a molded part into the mold during the extrusion-coating and is thereby embedded into the extrusion coating.

The side screen preferably has, in its front region, a lower edge which falls obliquely in the rearward direction, with the installation space required during the pivoting movement for the setting-out of the rear edge of the movable roof part being reduced.

The side screen preferably has, in its rear region, a rounding on its lower edge, as a result of which the pivoting movement for the setting-out of the rear edge with respect to the roof part which is arranged behind it is facilitated.

The control carriage is connected by means of a connection to a drive cable which is guided in a lateral cable channel of the guide rail. Said connection, which connects the drive cable to the control carriage, is led through below the side screen. The connection preferably has a U-shape.

The invention is particularly suitable for an externally guided sliding roof (ASD). The latter can also advantageously be a constituent part of a fixed-element cabriolet in which a sliding roof function firstly permits a partial opening of the roof before the entire roof is moved into a stowage space and the entire interior space of the vehicle is thereby opened in the upward direction.

BRIEF DESCRIPTION OF THE DRAWINGS

The vehicle roof is explained in more detail below on the basis of an exemplary embodiment and with reference to the drawing, in which.

DETAILED DESCRIPTION

Figure 1:
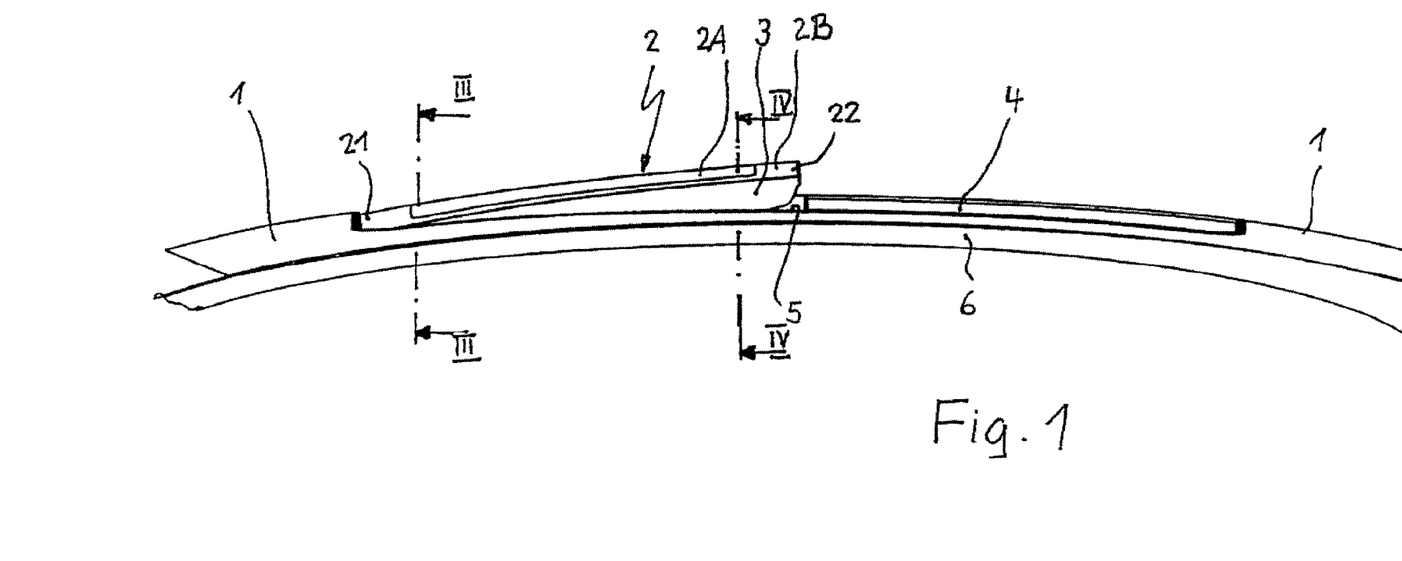
FIG. 1 shows a schematic side view of a vehicle roof having a rear fixed roof part and a movable front roof part in the set-out ventilation position.
Figure 2:
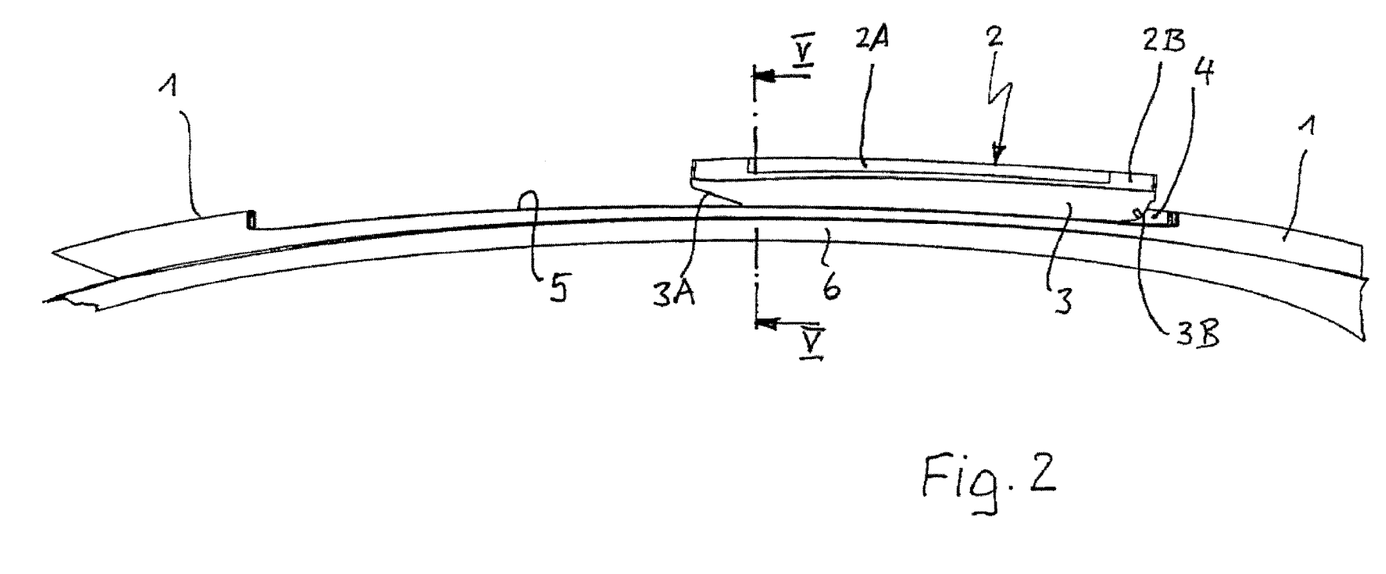
FIG. 2 shows a schematic side view of the vehicle roof as per FIG. 1 with the front roof part open.

The vehicle roof 1 shown in FIGS. 1 and 2 has, arranged in succession from front to rear, a movable roof part 2 which adjoins a windshield cowl above the windshield, and a rear fixed roof part 4. The movable roof part 2 is preferably formed by a glass pane 2 A (alternatively by a transparent plastic pane) and an extrusion coating 2 B, which surrounds the glass pane 2 A, in the form of a plastic frame. The movable roof part 2 can, by means of a mechanism which is described below, be set out with its rear edge into a ventilation position (FIG. 1) and, proceeding from the latter, be displaced rearward over the fixed roof part 4 (FIG. 2), with a roof opening 5 being largely opened and with the movable roof part 2 being supported close to its rear edge 22 at all times, even during its rearward displacement, in contrast to conventional lifting-sliding roofs referred to also as spoiler roofs. Such openable vehicle roofs, which are known from EP 0 863 817 B1, are referred to as externally guided sliding roofs (ASD), since a part of the mechanism which supports the rear edge 22 of the roof part 2—in this case a setting-out lever 40—is displaceable in a guide 46 (FIG. 4) which is open toward the upper side of the vehicle roof 1 even during a displacement behind the roof opening 5, and is thereby stably supported at all times. The guide 46 is covered in the upward direction by means of a seal 1 A on the side edge of the fixed vehicle roof 1 and additionally to the rear by means of a seal 4 A on the outer edge of the rear fixed roof part 4 which deflect out of the path of the setting-out lever 40 as it is displaced rearward.

Provided at both side edges of the movable roof part 2 is in each case one side screen 3 which is preferably formed in one piece with the extrusion coating 2 B. This can be realized on the one hand in that the side screen 3 is co-formed in the mold for the extrusion coating 2 B as a cavity, or in that a molded part which forms the side screen 3 is placed into the mold of the plastic frame of the extrusion coating 2 B before the extrusion-coating process. It is however also possible to form a side screen 3 as a separate component and to fasten it to the extrusion coating 2 B or to a reinforcement region 2 C of the movable roof part 2. The side screen 3 serves to laterally screen the setting-out and displacement mechanism in all operating positions of the movable roof part 2. Said side screen 3 additionally prevents the infiltration of side wind or dirt into the interior space or into the guide rail 7. The side screen 3 is completely independent of the setting-out and displacement mechanism of the roof part 2.

Figure 3:
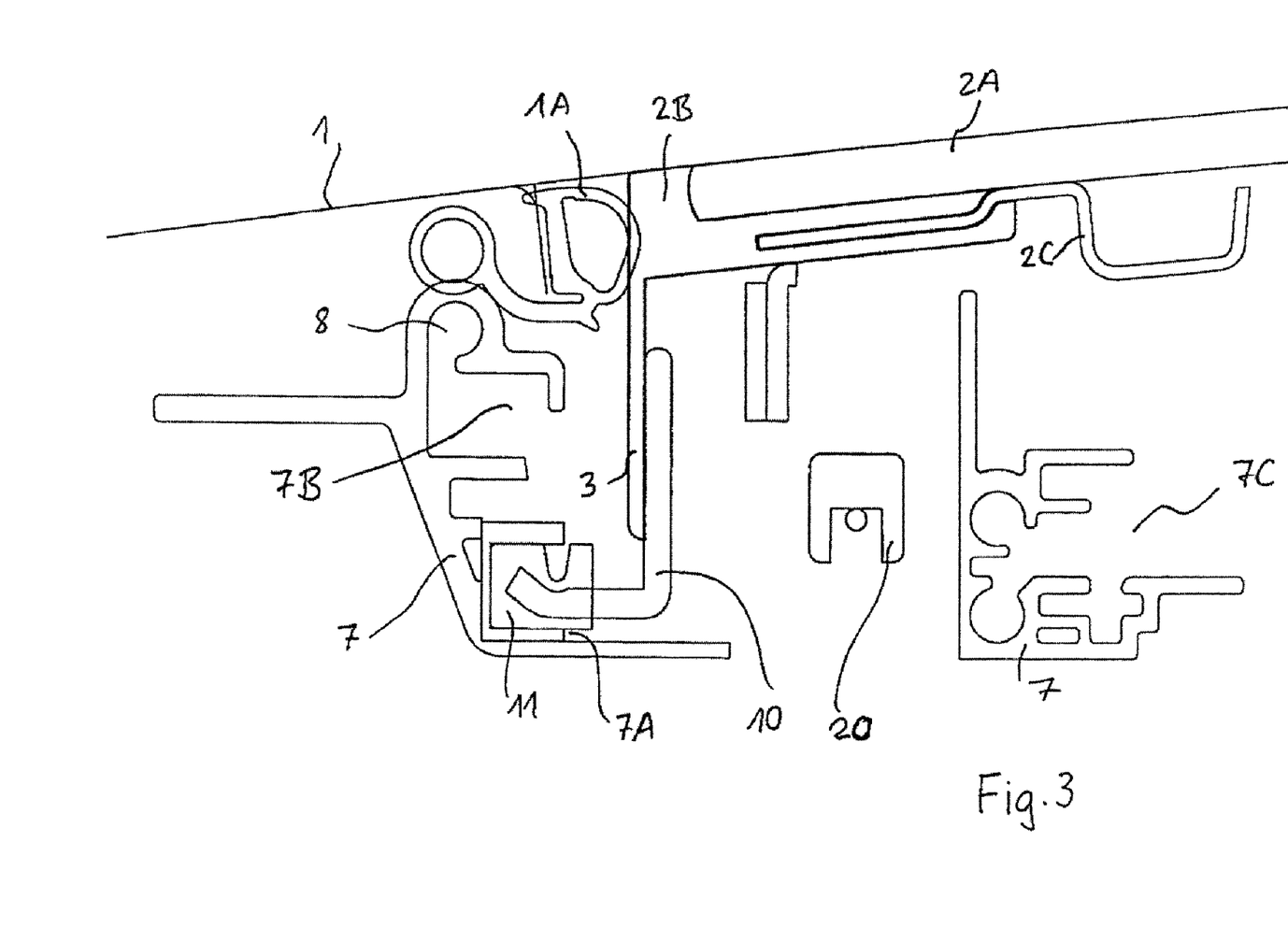
FIG. 3 shows a cross section through the front left part of the mechanism of the movable roof part as per the section line in FIG. 1.

FIG. 3 shows a lateral limb of a conventional wind deflector 20 which, when the roof is closed, bears against the front edge of the roof opening 5 below the movable roof part 2 and pivots upward into its operating position, preferably in a spring-loaded manner, only when the roof part 2 is displaced rearward. As an alternative to said wind deflector 20, it is also possible for a wind deflecting plate which can be set out to be arranged in front of the movable roof part 2.

The roof opening 5 is laterally delimited by lateral roof beams 6. The latter can be a constituent part of the fixed vehicle roof 1. They can however also, in the case of a fixed-element cabriolet, be movably arranged on the rear roof part 4 and can, after the movable roof part 2 has moved over the roof part 4, be released from the front region of the fixed vehicle roof 1 and, for example after being pivoted against the roof part 4, lowered with the entire roof pack into a stowage space.

Arranged on the fixed vehicle roof 1 or on the lateral roof beams 6 is in each case one guide rail 7 which extends both to the side of the roof opening 5 and also, behind the roof opening 5, into the roof part 4 and between the latter and the lateral roof beam 6, where said guide rail 7 forms the guide 46 for the lower support of the setting-out lever 40 during the displacement of the roof part 2 over the roof part 4. Formed in the guide rails 7 is in each case one cable channel 8 in which is guided a tension- and compression-resistant drive cable 9 which is connected to an electric drive (not illustrated). FIGS. 3 to 7 illustrate in each case only one guide rail 7, on the left side of the vehicle, with the associated mechanism. All the parts are however provided on both sides of the roof opening 5 mirror-symmetrically with respect to a central longitudinal axis.

The movable roof part 2 is connected, close to its front edge 21, to a front setting-out lever 10 which is mounted so as to be displaceable in the guide rail 7 by means of a front sliding element 11. The front setting-out lever 10 is guided with the front sliding element 11 so as to be displaceable, depending on the position, in different guide tracks 7 A (FIG. 3) or 7 B (FIG. 5) of the guide rail 7. The guide tracks 7 A and 7 B are connected to one another in the front region of the guide rail 7 by means of a rising ramp.

Figure 4:
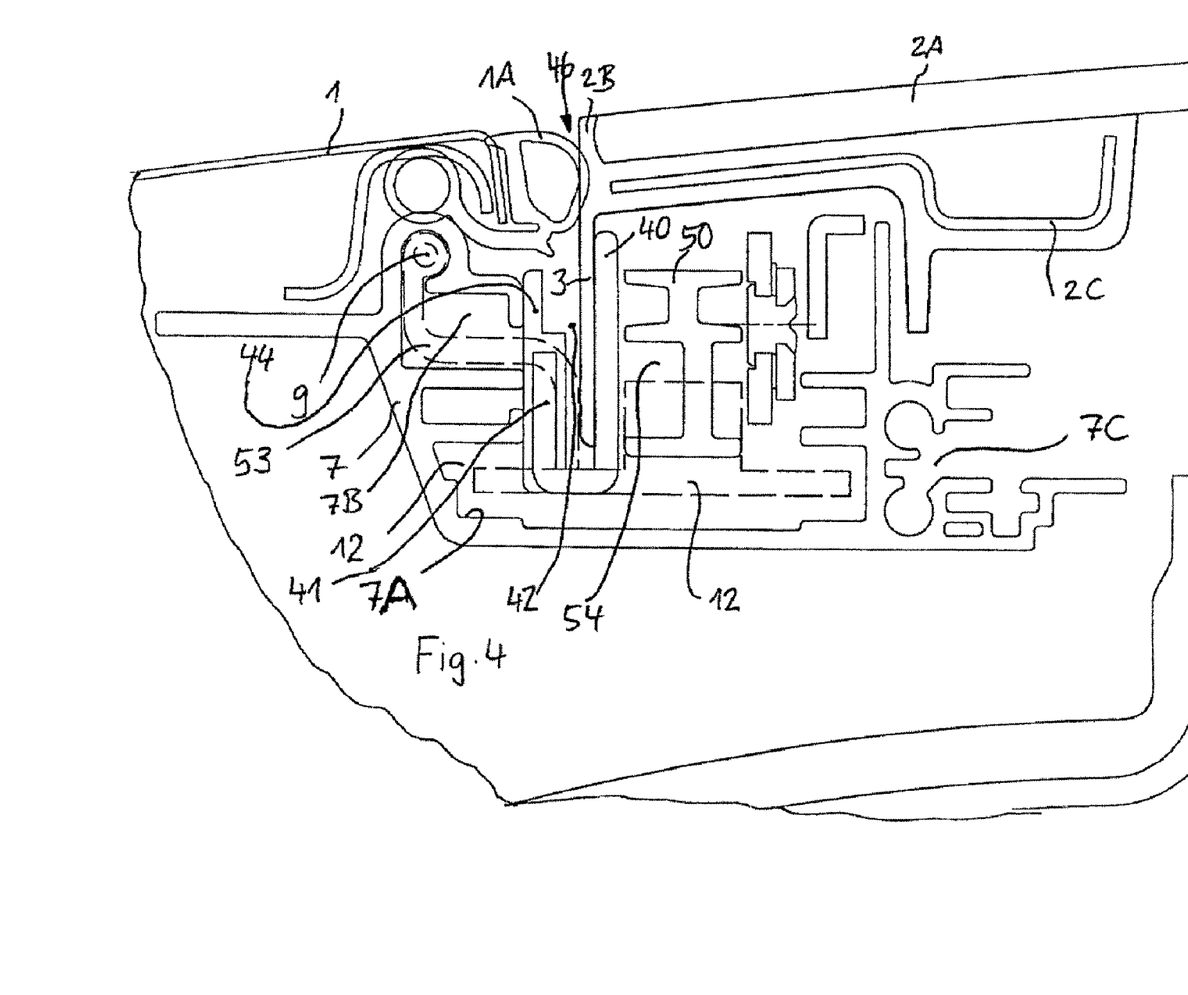
FIG. 4 shows a cross section through the rear left part of the mechanism of the movable roof part as per the section line IV-IV in FIG. 1.
Figure 6:
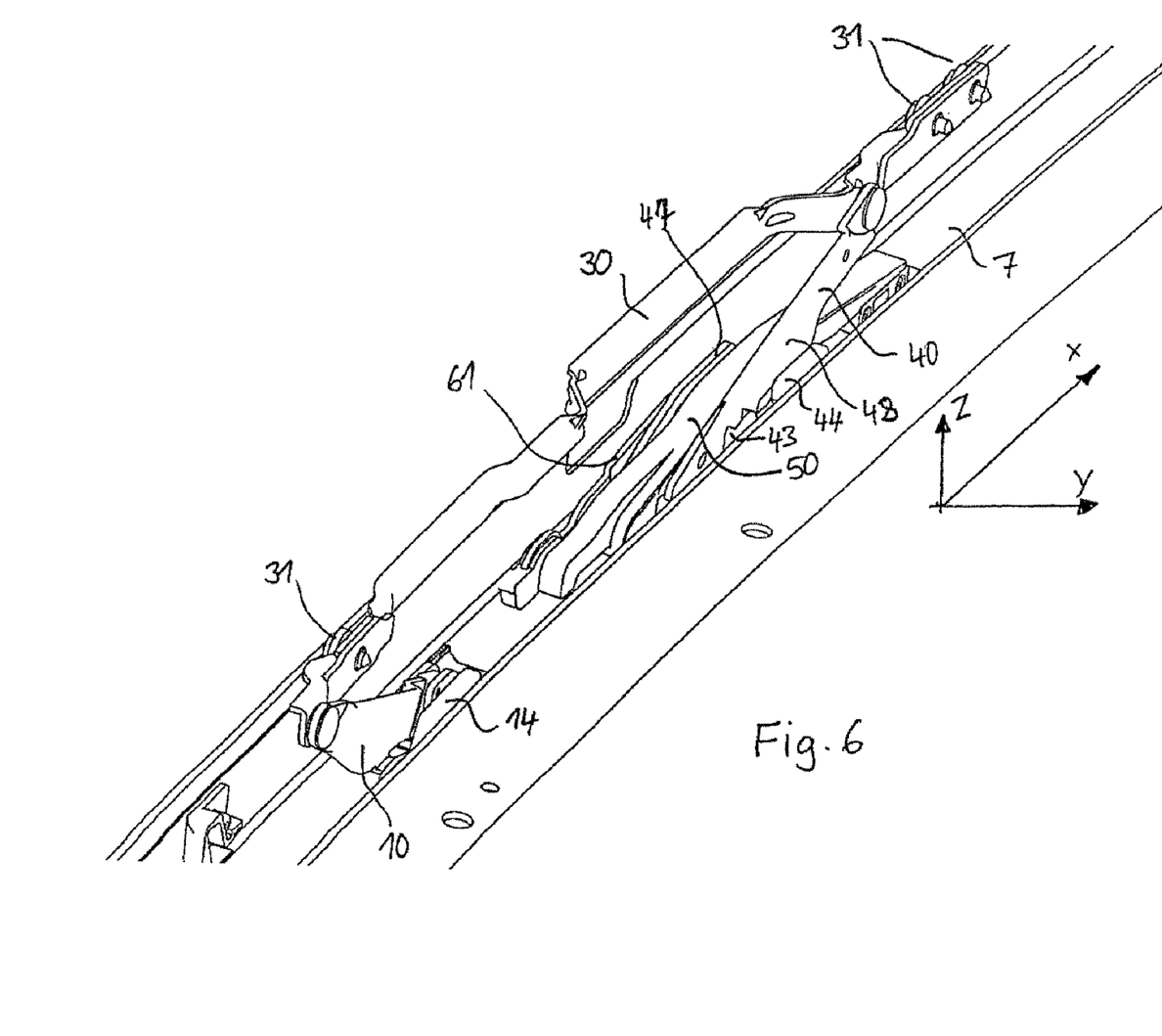
FIG. 6 shows a perspective illustration of the left part of the mechanism of the movable roof part.

Close to the rear end 22 of the movable roof part 2, a setting-out lever 40 is pivotably articulatedly connected by means of a joint to a cover support 30, which is connected to the roof part 2 by means of a plurality of fastening points 31, and a rear articulation which is fastened to said cover support 30. As can be seen most clearly from FIG. 6, the setting-out lever 40 is of two-part design in its front region: an outer limb 48 and an inner limb 47 which is connected thereto engage from below around a control carriage 50 in the region of an upwardly-arched curved control slot 54 (FIG. 4). The control slot 54 is provided at the outer side of the control carriage 50 in the rear region of the latter. The setting-out lever 40 engages into the control slot 54 with a front sliding element and a rear sliding element which is arranged approximately in the center of the setting-out lever 40 on the underside of the latter. A control slot which is identical in shape to the control slot 54 is preferably also formed on the inner side of the control carriage 50 in the rear region of the latter at the same height as viewed in the X direction and in the Z direction. The conventional co-ordinate system used in vehicle construction is indicated in FIG. 6. The X direction is defined as being parallel to the vehicle longitudinal axis, the Y direction parallel to the vehicle transverse axis and the Z direction parallel to the vehicle vertical axis. Sliding elements on the inner limb 47 of the setting-out lever 40, which sliding elements are arranged mirror-symmetrically with respect to the front sliding element and with respect to the rear sliding element, engage into said inwardly open control slot. The engagement of in each case two sliding elements into the control slots 54 on the control carriage 50 ensures a symmetrical introduction of force and particularly stable support of the movable roof part 2. The function would however also be ensured by means of a simple setting-out lever 40 which engages with only two sliding elements on one side into one control slot 54.

The control carriage 50 is displaceably mounted with a pair of front sliding elements and a pair of rear sliding elements 12 (FIG. 4) in a guide track 7 B of the guide rail 7. A connection 53 to the drive cable 9 is at the same time provided on the outer side at the level of the rear sliding element 12. The drive motor (not illustrated) therefore actuates the movable roof part 2 exclusively by means of a displacement of the control carriage 50. Arranged on the control carriage 50 in its front region is a further slot which is open toward the inner side. An outward-pointing control pin is also provided in the front region of the control carriage 50. The further slot serves for actuating a locking device which is formed by a locking lever 61 (FIG. 6) which is arranged parallel to the inner limb 41 of the setting-out lever 40 and of the control carriage 50, which locking lever 61 is pivotably mounted at its rear end with a joint on the inner limb 41 of the setting-out lever 40, and which, at its front end, supports a locking bolt on the inner side, that is to say facing toward the roof opening 5, and a control pin on the outer side, with the control pin being offset slightly downward and rearward with respect to the locking bolt.

The locking bolt engages into a slot which is provided on the inner side of the guide rail 7 and which has a profile which, from front to rear, initially is an obliquely falling profile which then merges into a horizontal guide track of the guide rail 7.

The control pin engages into the further slot on the control carriage 50. Since not all of the details of the setting-out and displacement mechanism and the locking device are illustrated in the present application, reference is made for further details to the prior German patent application 10 2005 007 032 as already cited in the introduction.

Figure 5:
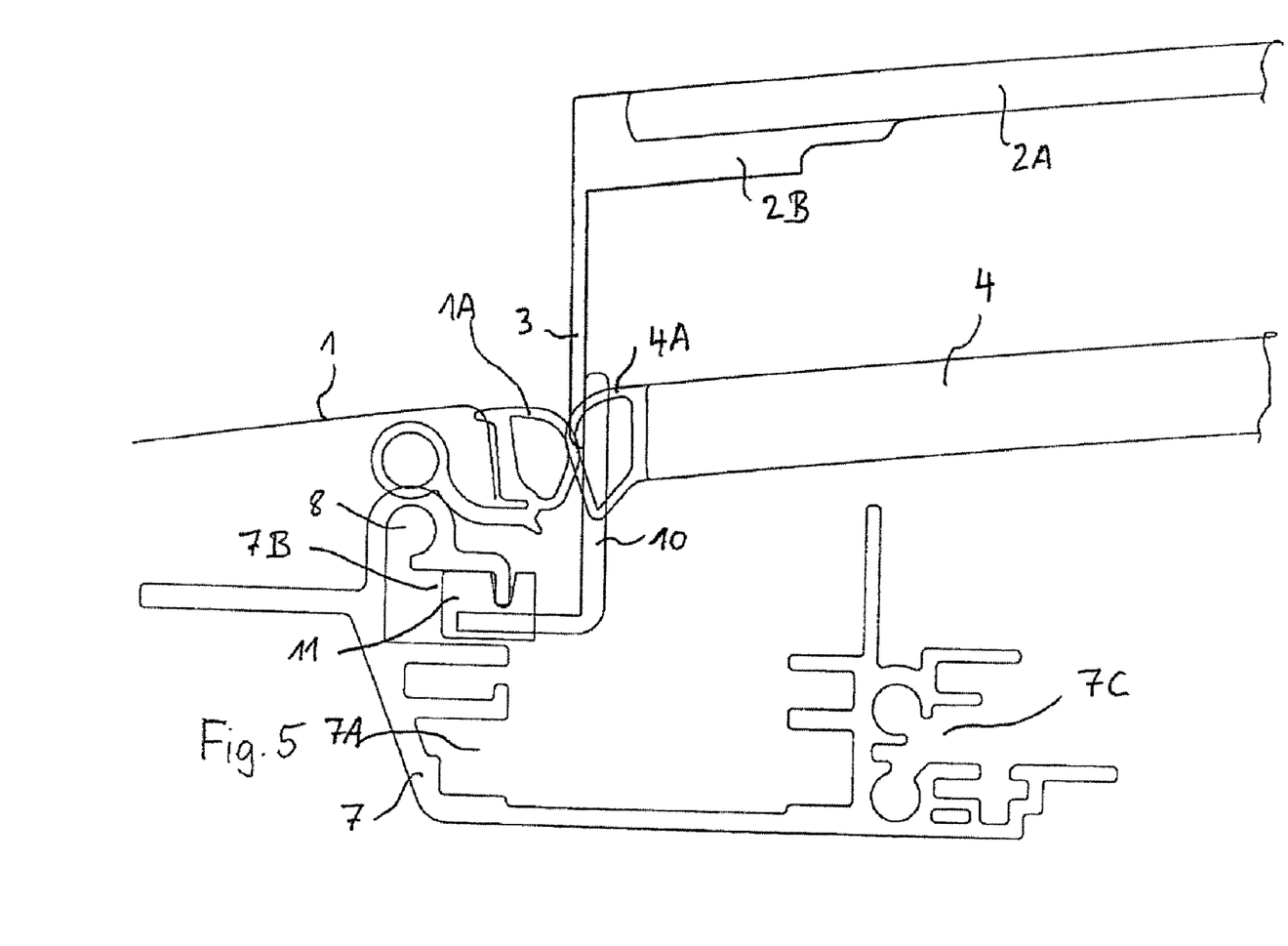
FIG. 5 shows a cross section through the front left part of the mechanism of the movable roof part in the completely open position as per the section line V-V in FIG. 2.

The side screen 3 which, according to the invention, is first provided in an externally-guided sliding roof (ASD) and is independent of the setting-out and displacement mechanism, is arranged such that, in all operating positions, it bears sealingly with its outer side against the seal 1A on the side edge of the roof opening 5 and in the rear part against the side edge of the fixed vehicle roof 1 in the region of the side beam 6 (FIGS. 3 and 4). In the rear part, said side screen 3 additionally bears with its inner side against a seal 4 A which is arranged on the side edge of the roof part 4 which is fixed at least at times (FIG. 5). The mechanisms for setting out and displacing the movable roof part 2 and the side screen 3 are coordinated with one another in such a way that the side screen bears from the outside virtually without play against the front setting-out lever 10 (FIGS. 3 and 5) and against the rear setting-out lever 40 (FIG. 4). As can be seen in FIG. 4, the connection 53 between the drive cable 9 and the rear sliding elements 12 of the control carriage 50 is designed so as to pass through below the side screen 3 in a U-shape. The mechanism as a whole therefore permits a side screen 3 which is uniform in height over the entire length. As can be seen in FIG. 2, there are exceptions to this only in the front part and in the rear part. In the front region, the lower edge 3 A of the side screen 3 is designed so as to fall obliquely in the rearward direction, so that, during a pivoting movement of the rear edge 22 of the roof part 2 into a ventilation position (FIG. 1), no additional installation height is required at the front by the side screen. In the rear region, a rounding 3 B is provided on the lower edge of the side screen 3, so that the rear edge 22 of the movable roof part 2 can pivot easily past the front edge of the fixed roof part 4.

The function of the above-described mechanism is described below, starting from the closed position.

In the closed position, the openable roof part 2 is in alignment with the fixed vehicle roof 1 and with the rear roof part 4 in the roof opening 5. Here, the roof part 2 is held close to its front edge 21 by means of the front setting-out lever 10. The front setting-out lever 10 is itself held in the Y direction and the Z direction, and is also secured in the X direction, by means of the web 13 indicated in FIG. 7 and the plastic extrusion coating 14 which is arranged thereon in connection with the front sliding element 11.

Figure 7:
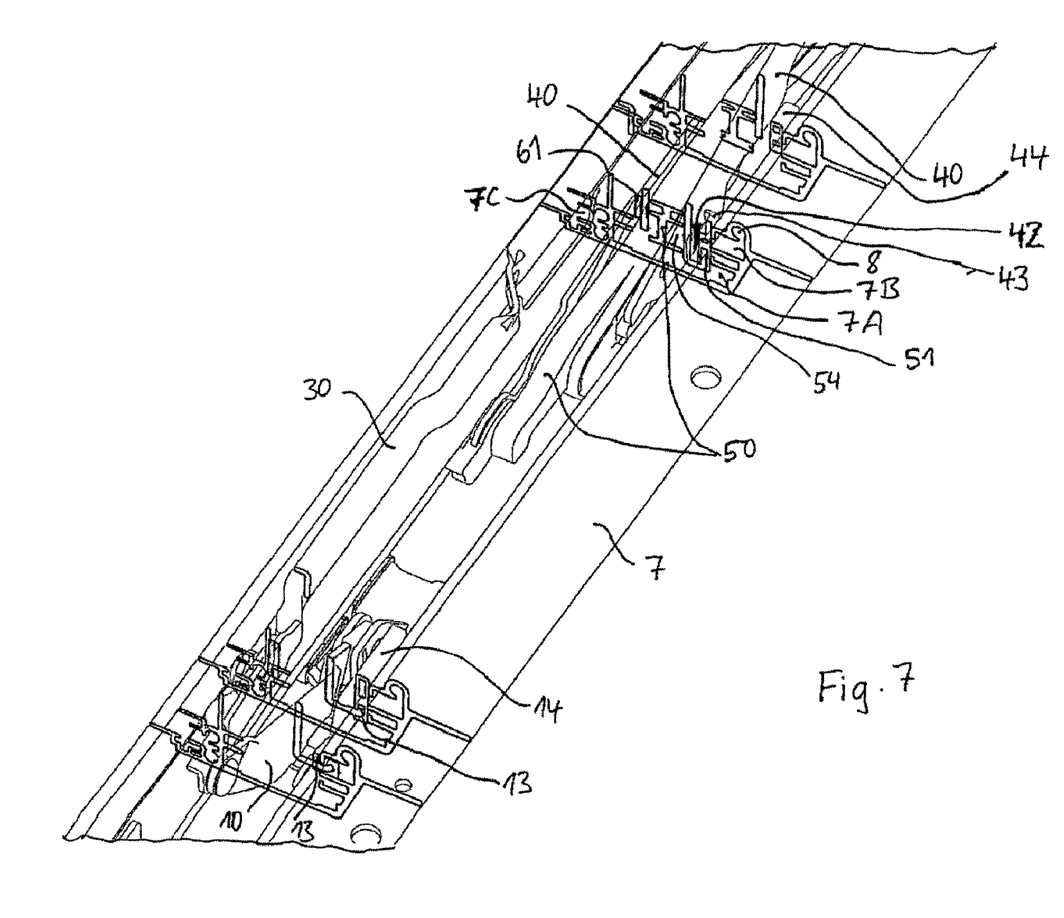
FIG. 7 shows a perspective illustration of the left part of the mechanism of the movable roof part with four cross sections through the guide rail embedded therein.

The rear end of the roof part 2 is held in the Y direction and in the Z direction by means of the setting-out lever 40, whose sliding elements are in engagement with the control slot 54 of the control carriage 50, and additionally by the web 41, which is indicated in FIG. 7 and is arranged parallel on the setting-out lever 40, with the plastic molded-on portions 43 and 44 arranged thereon, and is secured in the X direction by means of the engagement of the locking bolt (not illustrated) into the locking slot on the guide rail.

The opening movement of the cover 2 begins with a setting-out movement of the rear edge 22. For this purpose, the drive motor (not illustrated) moves the drive cable 9 rearward. Here, the control carriage 50 is displaced rearward by the same distance by means of the cable connection 53. Here, the control slot 54 moves relative to the sliding elements of the setting-out lever 40 from the closed position into the ventilation position illustrated in FIG. 1. While the front sliding element of the setting-out lever 40 is situated in the upper region in the closed position and the rear sliding element of the setting-out lever 40 is situated at the rear lower transition of the curved control slot 54, in the set-out position of the rear edge 22 of the roof part 2, the front sliding element of the setting-out lever 40 has moved into the lower front transition region and the rear sliding element of the setting-out lever 40 has moved into the upper central region of the control slot 54. In this way, the control lever 40 is forced to perform a counterclockwise pivoting movement which leads to the set-out position of the roof part 2 shown in FIG. 1. At the same time, as a result of the engagement of the control pin into the further slot, the locking bolt has been guided slightly rearward and slightly downward in the obliquely falling part of its associated slot, but without having already entered the horizontal guide track of the guide rail 7. In this way, the locking bolt (not illustrated), by means of the locking lever 61, still secures the setting-out lever 40 in its set-out position so as to prevent a rearward displacement.

For the complete opening of the roof part 2, the control carriage 50 is displaced further rearward from the set-out position by the drive cable 9. Here, the locking bolt is passed into the horizontal section of the associated slot by means of the guidance of the control pin in the further slot.

In the end position (FIG. 2), the roof opening 5 is largely opened. The setting-out lever 10 close to the front edge 21 of the movable roof part 2 is situated directly in front of the rear roof part 4. Said setting-out lever 10 can, for the complete opening of the roof part 2, also travel yet further rearward adjacent to the front region of the rear roof part 4. The closing movement of the movable roof part 2 takes place in precisely the reverse sequence to the sequence described above.

An advantage of the above-described mechanism for an externally guided sliding roof is that the drive from the closed position via the set-out position of the rear edge to the fully-open position takes place in the same direction by means of a single control carriage 50. All of the temporary locking actions, which are required for this purpose, of the front carriage 10 and of the setting-out lever 40 so as to prevent an early displacement are controlled directly or indirectly by said control carriage 50. The mechanism is of considerably smaller construction than the prior art recognized in the introduction. In the X direction, a single continuous guide rail 7 is used on each side, which guide rail 7 merges into the rear guide 46 for the support of the setting-out lever 40. In this way, the width of the mechanism in the Y direction is likewise considerably reduced. The above-described mechanism also is reduced to a minimum with regard to height (Z direction). The flat curved slot 54 of the control carriage 50 requires minimal drive forces for generating the setting-out movement for the setting-out lever 40. A continuous, jerk-free actuation of the movable roof part 2 is ensured, which also allows a direct pass through from the closed position via the ventilation position into the fully-open position without large and abruptly-changing drive forces, which could confuse an anti-trap arrangement sensor, being required here. The continuous side screen 3 hides the mechanism from view from the side in all operating phases and creates a visually pleasant appearance without adversely affecting the mechanism or entailing an increased installation space. Since said side screen 3 has no load-bearing function to perform, it can be of very narrow design. Said side screen 3 is held, in FIG. 7, by the narrow gap 42 between the outer side of the outer limb 48 of the setting-out lever 40 and the web 41 which is integrally formed on the outside of the latter, which web 41 supports the additional plastic molded-on portions 43 and 44 for additional support in the Y direction.

In the front region, the side screen 3 is formed by the narrow gap between the front setting-out lever 10 and the parallel web 13 which is integrally formed on the outside of the latter, on which web 13 is likewise integrally formed an additional plastic molded-on portion 14 for additional support of the mechanism and therefore of the displaceable roof part 2 in the Y direction.

LIST OF REFERENCE SYMBOLS

1 Vehicle roof
1A Seal (on 1)
2 (Movable) roof part
2 A Glass plate
2 B Extrusion coating
2 C Reinforcement region
3 Side screen
4 (Fixed) roof part
4 A Seal (on 4)
5 Roof opening
6 (Side) roof beam
7 Guide rail
7 A First guide channel (on 7)
7 B Second guide channel (on 7)
7 C Third guide channel (on 7, for roller blind)
8 Cable channel
9 Drive cable
10 (Front) setting-out lever
11 (Front) sliding element
12 (Rear) sliding element
13 Web
14 Plastic molded-on portion
20 Wind deflector
21 Front edge (of 2)
22 Rear edge (of 2)
30 Cover support
40 Setting-out lever
41 Web
42 Gap
43 Plastic molded-on portion
44 Plastic molded-on portion
46 Guide
47 Inner limb (of 40)
48 Outer limb (of 40)
50 Control carriage
53 Connection to drive cable
54 Control slot (for 40)
61 Locking lever

The invention claimed is:

1. A vehicle roof having a movable roof part including respective front and rear edges and lateral edges which, by a rear setting-out lever articulatedly connected in a region of the rear edge, can firstly be set out into a ventilation position by a setting out movement and can subsequently be displaced above the vehicle roof by a displacement movement to at least partially open a roof opening in the vehicle roof, the movable roof part having a side screen in a region of each lateral edge of the movable roof part, wherein the rear setting-out lever continuously supports the movable roof part in the region of the rear edge of the movable roof part both during the setting-out movement and also during the displacement movement as the movable roof part is displaced rearwardly from the ventilation position, and wherein the side screen, which is independent of the support of the movable roof part, bears continuously, both during the setting-out movement and also during the displacement movement as the movable roof part is displaced rearwardly from the ventilation position, against a first seal arranged on an edge of the roof opening, wherein the vehicle roof part has a second seal against which the side screen bears with an inner side thereof during a rearward displacement of the movable roof part.

2. The vehicle roof as claimed in claim 1, wherein the rear setting-out lever is arranged directly adjacent to the inner side of the side screen.

3. The vehicle roof as claimed in claim 1, wherein the movable roof part, for the lifting of its front edge, is pivotably articulatedly connected to a front setting-out lever, with the front setting-out lever being arranged directly adjacent to the inner side of the side screen.

4. The vehicle roof as claimed in claim 1, wherein the movable roof part is formed by a glass plate and an extrusion coating, which surrounds the glass plate, in the form of a plastic frame, and the side screen is formed in one piece with the extrusion coating.

5. The vehicle roof as claimed in claim 1, wherein the side screen has, in a front region, a lower edge which falls obliquely in a rearward direction.

6. The vehicle roof as claimed in claim 1, wherein the side screen has, in a rear region, a rounding on a lower edge.

7. The vehicle roof as claimed in claim 1, wherein the movable roof part is formed by a glass plate and an extrusion coating surrounding the glass plate, and the side screen is molded into the extrusion coating.

* * * * *